United States Patent [19]

Froehlich et al.

[11] Patent Number: 4,479,158
[45] Date of Patent: Oct. 23, 1984

[54] STATIONARY MAGNETIC HEAD WITH A FLUID OPERATED TAPE LIFTER

[75] Inventors: Frederick B. Froehlich; Paul Y. Hu, both of Tucson, Ariz.

[73] Assignee: International Business Machines Corp., Armonk, N.Y.

[21] Appl. No.: 377,284

[22] Filed: May 12, 1982

[51] Int. Cl.³ .................... G11B 15/60; G11B 5/60; G11B 15/64; G11B 17/32
[52] U.S. Cl. .................... 360/130.1; 360/102
[58] Field of Search .................... 360/102–103, 360/109, 121–122, 125, 130.1

[56] References Cited

U.S. PATENT DOCUMENTS 3,327,916  6/1967  Weidenhammer ............ 360/102 X

FOREIGN PATENT DOCUMENTS 54-49104  4/1979  Japan .................... 360/102
54-99607  8/1979  Japan .................... 360/102

*Primary Examiner*—John H. Wolff
*Attorney, Agent, or Firm*—J. A. Pershon

[57] ABSTRACT

Fluid is introduced under pressure to the operative face of a magnetic head to lift the magnetic media out of contact with the transducers when the media is stationary or about to be stopped. The media is lifted only locally with respect to the multiple transducers of the magnetic head. The fluid pressure tents the tape with the pressure adjusted such that the media forms a seal with the head at the edges of the media to hold the fluid within the tent-like structure. Slots formed in the magnetic head at the leading and trailing edges allow the fluid to escape to keep the media from excessively lifting from the magnetic head. The fluid pressure is under control of a valve that introduces the pressure to the operative face of the head as well as opening the operative face to atmospheric pressure when the fluid pressure is halted to permit the media tension to quickly pull the media back into contact with the transducers by assisting the slots in dissipating the fluid pressure.

26 Claims, 4 Drawing Figures

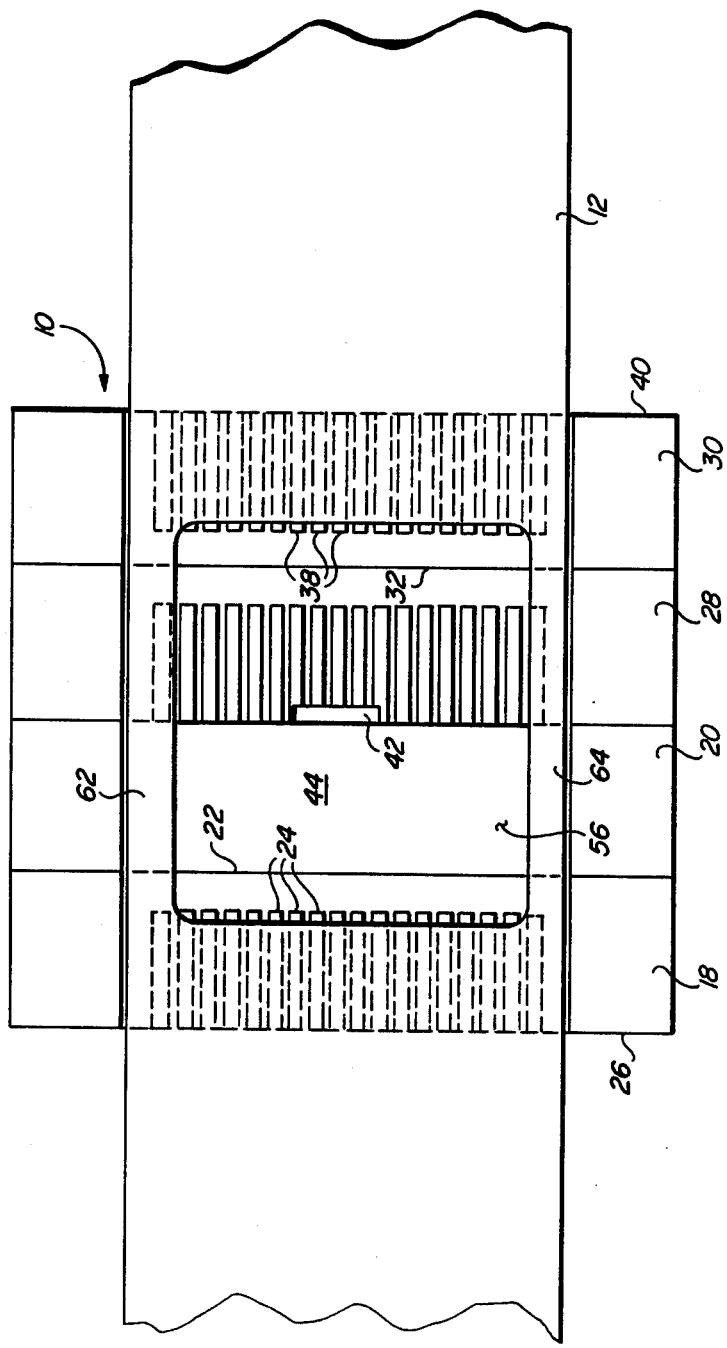

STATIONARY MAGNETIC HEAD WITH A FLUID OPERATED TAPE LIFTER

FIELD OF THE INVENTION

This invention relates to a stationary magnetic head with a media transport and, in particular, to a stationary magnetic head provided with a fluid operated media lifter for operation on a stopped media.

BACKGROUND OF THE INVENTION

A problem has arisen with the highly polished surfaces now being provided on the operative faces of magnetic heads as well as on the flexible magnetic media coating. Both the media and the head include the highly polished contact surfaces in order to diminish undo wear and improve output electrical signals when the media, such as the magnetic tape, is pulled over the magnetic head to read and write information to and from the magnetic tape. However, these highly polished surfaces cause a problem when the tape is stationary or near stationary, as is required in the start and stop operations standard in data processing systems. The two highly polished surfaces cause the tape to "wring-in" and thereby cling to the magnetic head face. Present day high-speed and high-throughput data processing systems require a rapid start of the tape when the start command is given after the tape is stopped at the position required for the next block of data information to be obtained from the tape. With the highly polished surfaces, the tape clings to the operative face of the head and prevents a rapid start until the tape is in motion and an air bearing is built up between the two highly polished surfaces.

It is, therefore, an object of the present invention to provide a means for overcoming the clinging of the tape to the head to permit a rapid start and stop operation of the data processing system.

DESCRIPTION OF THE PRIOR ART

It is well known in the magnetic tape and magnetic head art to provide a pressurized fluid between the operative face of the magnetic head and the magnetic tape as it passes over the magnetic head. The introduction of the pressurized fluid was to space the magnetic tape a small distance away from the magnetic head in order to cut down the wear when the inevitable contact occurred between the tape and the head as the tape passed over the head. The pressurized fluid was introduced during the time when the magnetic tape was in motion over the magnetic head.

It is, therefore, another object of the present invention to provide a means for introducing fluid pressure under a stationary magnetic media.

A U.S. Pat. No 3,939,493, issued to Fowler, et al, entitled "Tape Lifter" and assigned to the assignee of the present invention discloses a fluid pressure device for lifting the tape locally away from a rotating head as the head rotates with the tape stationary. Only the tape in the vicinity of the head is lifted and the lifting is performed to keep the head away from the tape when the head is not sensing data from the tape. The fluid flow lifts the tape without allowing an easy dissipation between the mandrel and the head rotor. The tape is lifted only locally about the head so that the recovery time for continuing a read/write operation is kept to a minimum.

There is no showing, as with the present invention, of a tape lifter for a stationary magnetic head and a stationary media wherein the slots, formed in the magnetic head surface to control the flying distance between the media and the head, are used to control the spacing between the media and the head during a stop situation and wherein the lifter itself, as well as the slots, assist in the dissipation of the fluid to shorten the recovery time for renewal of the read/write operations.

Yet another object of the present invention, therefore, is to provide a controlled fluid tape lifter that operates with a stationary magnetic head and a stationary media with a controlled lift and operation that permits a short recovery time to return to normal read/write operations after the stopping of the tape between operations.

SUMMARY OF THE INVENTION

In accordance with the present invention, a magnetic head includes a fluid entry device placed approximate to the center of the head. The fluid entry device is controlled by a valve which, when activated, allows a fluid pressure to be injected in the area of the operative face of the magnetic head between a magnetic media and the head when the motion of the tape is about to be stopped. The valve in the deactivated state prevents the entry of the fluid pressure into the lifter device and also opens the lifter device to atmospheric pressure. The pressure provided by the lifter device, between the magnetic head and the magnetic media, is such that the media is lifted from contact with the transducers of the head to form a tent over the transducers. The head includes slots in its operative face formed parallel to the tape path to control the fluid flow, such that the media flies at a preset distance from the transducers. The slots in the head allow the fluid to leak away when the tape is moving past the head. With the lifter fluid pressure activated when the tape is stationary, the slots are gauged to permit some fluid to leak around the tent formed by the tape. The tent can be quickly dissipated upon a reactivation to return to a sensing operation by the action of the leakage of the fluid pressure through the slots, as well as through the opening of the lifter device to atmospheric pressure.

The present invention provides a magnetic head for sensing magnetic transitions from a magnetic media that includes a plurality of transducers on its operative face for sensing the magnetic transitions as the magnetic media passes adjacent to the transducers. A plurality of slots are formed in the operative face of the magnetic head. At least some of the slots are formed parallel to the motion of the magnetic media and are adjacent to the beginning and end of the tape contact with the operative face of the magnetic head. The magnetic head further includes a means for introducing a fluid under pressure between the magnetic media and the transducers. Means are provided for controlling the pressure of the fluid entry into the means for introducing the fluid. The fluid under pressure, when actuated with the media stopped or near stop adjacent to the operative face of the magnetic head, forms the media into a tent-like structure over the head transducers. The pressurized fluid is contained within the tent-like structure and is permitted to be controllably released into the slots. The means for controlling the fluid pressure preferably opens the means for introducing the fluid to atmospheric pressure when it halts the entry of the pressurized fluid between the head and the media.

It is, therefore, a primary object of the present invention to provide a fluid operated tape lifter that operates with a stationary mounted head to lift the media away from the head when the media is also stationary in the non-recording mode, while using the slots in the head to control the distance between the tape and the head when the pressurized fluid is entered and to permit a dissipation of the fluid when the head transducing action continues.

The main object of the present invention is to provide an enhanced magnetic head and media interface for start/stop media-to-head interaction.

Another object of the present invention is to provide a means for preventing the media from clinging to the head when the movement of the media is halted in a start/stop drive operation.

These and other objects of the present invention will become apparent to those skilled in the art as the description proceeds.

BRIEF DESCRIPTION OF THE DRAWING

The various novel features of this invention, along with the foregoing and other objects, as well as the invention itself, both as to its organization and method of operation, may be fully understood from the following description of illustrated embodiments when read in conjunction with the accompanying drawing, wherein:

FIG. 4 is a view taken along line 4—4 of FIG. 3 showing the approximate interface of the media with the head with the lifter in operation.

DESCRIPTION OF THE PREFERRED EMBODIMENT

Figure 1:
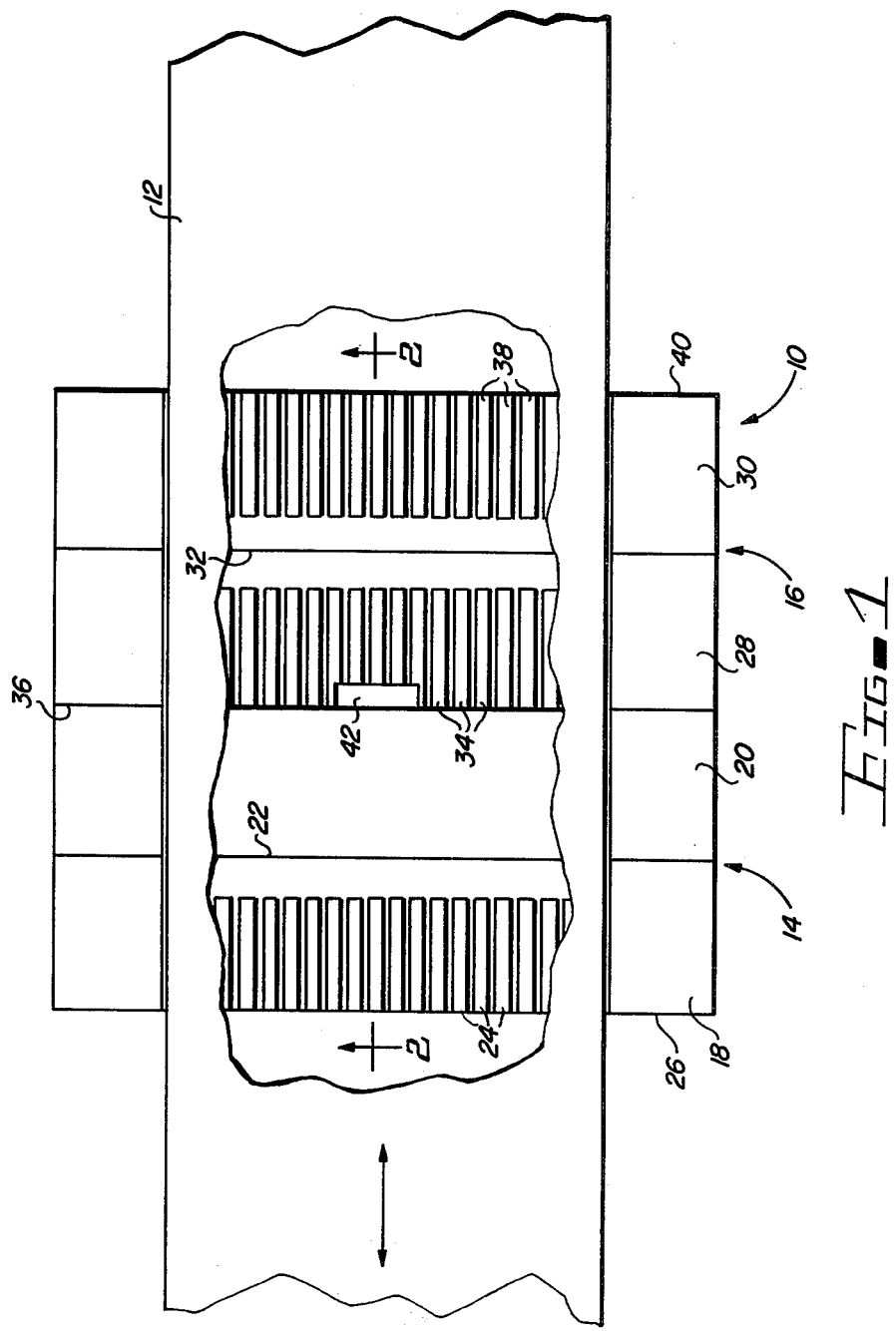
FIG. 1 is a top plan view of a tape media and head interface with a section of the tape cutout to show the transducers and the tape lifter.

In FIG. 1, a magnetic head 10 is shown with a magnetic tape media 12 interfacing with the head 10 in its operative position to read and write magnetic transitions between the head 10 and the tape 12 for use in a data processing system. The head 10 includes a write module 14 and a read module 16. The write module 14 includes a write chip 18 and a write closure 20. A plurality of transducers are formed at a write transducing line 22 formed between the write chip 18 and the write closure 20. The individual write transducers (not shown) can be readily formed by any of the techniques well known in the magnetic head art. The write chip 18 includes a plurality of write forward blind slots 24 formed in a leading face 26 of the magnetic head.

The read module 16 includes a read closure 28 and a read chip 30. The read closure 28 and the read chip 30 form a read transducing gap 32 which includes a plurality of read transducers matching in number and formed in line with the write transducers of the write transducing gap line 22. The read transducers can be formed in any of the standard configurations and procedures as is well known in the art. The read closure 28 includes a plurality of read forward blind slots 34 formed in its leading face at a bond line 36 formed between the write module 14 and the read module 16. The read chip 30 includes a plurality of read backward slots 38 formed at the trailing edge 40 of the read chip 30 which is also the trailing edge of the magnetic head 10. A tube 42 is included in an opening created by a rectangular cutaway within the read module at the approximate center of the magnetic head. The tube 42 permits the entry of the fluid flow between the head 10 and the media 12 in the manner according to the present invention as will be further described.

Figure 2:
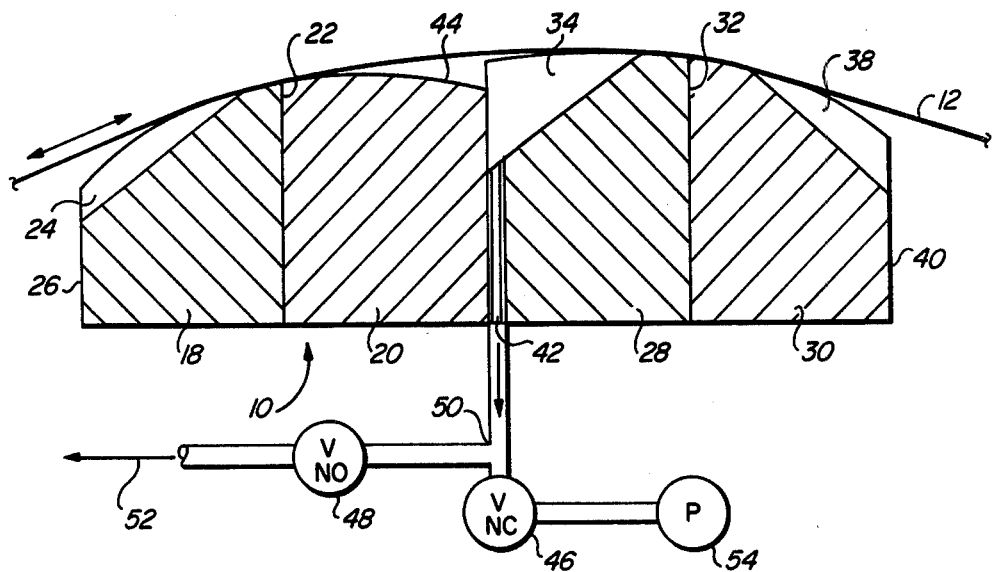
FIG. 2 is a cross-sectional view taken along line 2—2 of FIG. 1.

FIG. 2 shows the position of the magnetic tape 12 in a normal read/write operation. The magnetic head 10 is shaped such that the tape 12 flies very close to the write transducer line 22 and the read transducer line 32. The slots 24, for instance, are formed in the write chip 18 to assist in keeping the tape 12 close to the write transducer gap 22 in the forward direction of motion. The slots 34 in the read closure 28 are likewise used to keep the tape 12 in a close flying height from the read transducer gap 32 in the forward direction of motion. The operation of the slots 24 and the slots 34 are mainly for use when the tape is travelling in the direction from the supply reel to the take-up reel, which is the forward direction in this consideration, with the leading edge 26 being the side that first contacts the tape as it travels to the trailing edge 40. The head 10 is conditioned to transduce with the tape travelling in the opposite direction. In this instance, the slots 38 in the read chip 30 operate to keep the tape 12 in close contact with the read transducer gap 32. Normally, the magnetic heads are required to only read data from the tape 12 when the tape is travelling in the reverse direction from the take-up reel to the supply reel. Thus, when the magnetic tape 12 is moving over the magnetic head 10, the tape 12 is in close association with an operative face 44 of the head 10. The operative face 44 includes a land area adjacent to the slots and the transducing gap areas as well as the areas adjacent to the transducing gaps. With the tape 12 and the head 10 in operative transducing association, the lifter tube is open to atmospheric pressure. Thus in the transducing operation, a normally closed valve 46 is inoperative in its normally closed position and a normally open valve 48 is in its inoperative position, that is, normally open. Since the valve 48 is in its normally open position, the lifter tube 42 through connecting tubes 50 is open to atmospheric pressure as shown by the direction of the arrow 52. A pump 54 may or may not be operating because, in any event, valve 46 is closed and no fluid pressure is directed to the lifter tube 42.

Figure 3:
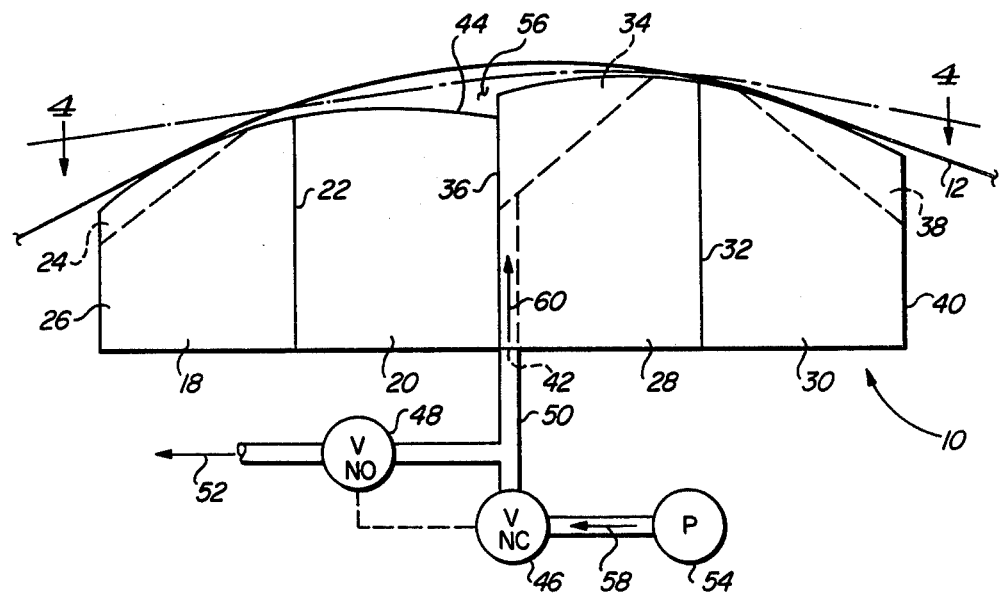
FIG. 3 is a side plan view of the magnetic head of FIG. 1 with the tape lifter in operation.

FIG. 3 shows the relative position of the tape 12 to the operative face 44 of the magnetic head 10. The tape 12 forms a tent-like structure 56 above the operative face 44. In this instance, the normally open valve 48 is activated to close the valve and shut off the exhausting of the pressure to the atmosphere. The normally closed valve 46 is activated to allow the fluid pressure from pump 54 to move in the direction of the arrows 58 and 60 into the area between the operative face 44 and the tape 12. The fluid pressure is controlled such that the tape 12 is lifted away from contact with most of the operative face 44 of the head 10. The tape 12 is lifted away from the write transducing gap 22 and the read transducing gap 32. The tape is in contact with the write chip 18 and the read chip 30 in the land area adjacent to the slots 24 and 38 respectively. FIG. 4 shows the area of contact between the tape 12 and the magnetic head 10.

Referring to FIG. 4, the fluid pressure into the tent-like structure 56 is of a set amount such that with the tension placed upon the tape 12 between a take-up reel and a supply reel (not shown), the fluid pressure entered through the lifter tube 42 between the tape 12 and the operative face 44 places the tape in contact with the head along the periphery of the tent-like structure 56. The tape 12 is therefore in contact at the leading edge 26 of the head, in the area of the slots 24, such that the tape 12 covers the major portion of the area of the slots but leaves an opening into the tent-like structure to allow some of the fluid to escape through the slots 24. Likewise, at the trailing edge 40 of the head 10, the tape 12 covers a major portion of the area of the slots 38 but again leaves a space such that some of the fluid directed into the tent-like structure 56 can escape through the slots 38. The tape 12 comes in contact with the head 10 along the edges of the tape in the area shown by the reference numerals 62 and 64. The tape 12 forms somewhat of a seal in the areas 62 and 64 in order to permit the tent-like structure 56 to form. As shown in FIG. 4, the tape 12, at this time in the stationary position, is held away from the major portion of the operative face 44 and is held away from the write transducing gap 22 as well as the read transducing gap 32. Read and write operations are not taking place because at this time the tape is stationary.

Reference is made to FIGS. 1–4 for the operation of the invention as described in the preferred embodiment shown. The tape 12 is threaded over the head 10 and, as long as the tape is in motion, the interface between the tape and the head is as shown in FIG. 2. The transducers of the head are activated and a read/write operation is performed. The valves 46 and 48 are not activated and therefore any pressure built up in the interface between the tape and the head is exhausted through the tape lifter 42 into the connecting tubes 50 and out the valve 48 in the direction of the arrow 52 (FIG. 2) in order to keep the area adjacent the operative face 44 of the head at atmospheric pressure or a natural foil air bearing pressure. When the tape is stopped for whatever reason, such as when the tape drive is awaiting a further command to sense the next group of data information from the tape 12, the tape and head interface is as shown in FIGS. 3 and 4. The tent-like structure 56 is formed between the tape and the operative face 44 of the head 10. The tent-like structure 56 is formed since both valves 46 and 48 are activated and the fluid pressure from pump 54 is directed as shown by arrow 58 through the activated valve 46 into the connecting tubes 50 and along the tape lifter tube 42 in the direction of arrow 60. The valve 48 is in a closed position. The fluid pressure forms the tent-like structure with the fluid exhausting through the slots 24 and 38 in order to control the distance between the tape 12 and the operative face 44 of the head 10.

At the start-up time where the transducing action between the head 10 and the tape 12 must again be activated, the valves 46 and 48 are deactivated. The tent-like structure 56 collapses immediately because the fluid pressure is vented through the slots 24 and 38, and in the reverse direction opposite the direction of the arrow 60 through the lifter tube 42 out the connecting tubes 50 and the valve 48 to return the pressure between the tape 12 and the operative face 44 of the head 10 to atmospheric pressure or a natural foil air bearing pressure. Thus the operation of the valves 46 and 48 allows the pressurized fluid to be injected between the tape and the head when a stop command is received by the tape drive. The valves 46 and 48 in the deactivated state prevent the entry of the fluid pressure into the tape lifter tube and also opens the lifter tube 42 to atmospheric pressure to prevent any abnormal buildup of pressure between the tape 12 and the head 10. When the stop command is received, the valves 46 and 48 are activated and the fluid pressure provided through the lifter tube 42 is such that the tape is lifted from contact with the transducers thereby forming a tent-like structure 56 over the transducers. The head 10 includes the slots 24 and 38 in its face formed parallel to the tape path to have the tape fly at a preset distance from the transducers. The slots in the head allow the pressurized fluid to exhaust. The pressure is gauged such that the tent-like structure 56 can be quickly dissipated when a start command is received. The start command deactivates the valves 46 and 48 to quickly collapse the tent-like structure 56 by the action of the leakage of the fluid flow through the slots 24 and 38 as well as in the reverse direction through the lifter tube out the valve 48 to atmospheric pressure.

As shown in FIG. 1, the position of the lifter tube 42 is approximate to the center of the head 10. The dimensions of the lifter tube are determined by the slots 34 and for the preferred embodiment is about 15 millimeters in the width of the tube along the direction of the tape and the length direction is about 40 millimeters. The tape tension is kept at about 8 ounces in a one-half inch tape of a 0.001 inch thickness. The air pressure, in order to form an acceptable tent-like structure, is from 2 to 5 pounds per square inch. The fluid escape path, through the slots in the head, produces in effect a sort of wedge lift while the remaining contact area around the periphery of the magnetic head serves, in effect, as a hinge. Therefore, for the purposes of the transducing action, there is a hinge at the write module 14 as well as a hinge at the read module 16. The hinge concept produces, in effect, a very fast response tape lifting and a very fast collapse of the fluid bubble upon the removal of the fluid in preparation for a normal read/write operation.

The principles of the present invention have now been made clear in an illustrative embodiment. There will be immediately obvious to those skilled in the art many modifications of the structure, arrangement, proportions, the elements, materials and components used in the practice of the invention. For instance, many different shapes of tubing, such as rectangular, square or circular, can be used for the lifter tube 42. A slot cut into the ceramic material of the head could form the tube required to carry the fluid to the operative face of the head. A different placement of the tube, other than in the read module or at the exact center of the head, and the number of tubes are anticipated by this invention, the only criteria being that a symmetrical lifting pattern be established on the operative face of the magnetic head. The pressure of the fluid must be such as to create a tent-like structure with an escape path at the leading and trailing edges of the head. The particular shape of the head is included as part of the best mode of the present invention, but the invention itself should not be limited as to the shape and placement of the individual transducers as disclosed. It should be evident that valves 46 and 48 could be encompassed in one package with the valve opening the entry of the passage for the fluid pressure while the valve is closing the exhaust into atmospheric pressure. The appended claims are, therefore, intended to cover and embrace any such modification within the limits only of the true spirit and scope of the invention.

What is claimed is:

1. A magnetic head for sensing magnetic transitions from a flexible magnetic medium comprising:
   a plurality of transducers situated on an operative face of the head for sensing the magnetic transitions as the medium passes adjacent to the transducers;
   said operative face having a plurality of slots, at least some of which are formed parallel to the motion of the medium and adjacent to the leading and trailing edges of the medium contact with the operative face;
   means for introducing fluid under pressure between the medium and the operative face of the head; and
   means connected to said fluid introducing means for controlling the fluid under pressure entering into said fluid introducing means;
   said fluid introducing means, when actuated, introducing the fluid under pressure such that the medium forms into a tent-like structure over the operative face of the head with the fluid being contained within the tent-like structure and permitted to controllably escape through the slots;
   said controlling means being actuated to provide fluid to said fluid introducing means when said medium is substantially stationary relative to said head;
   wherein said fluid will quickly evacuate through the slots when said controlling means stops the entry of fluid under pressure into said fluid introducing means.

2. A magnetic head as defined in claim 1 wherein said controlling means opens said fluid introducing means to atmospheric pressure in the deactivated state.

3. A magnetic head as defined in claim 1 wherein said fluid under pressure effects a wedge lift of the media in a hinge format at the parallel slots and adjacent to the leading and trailing edges of the operative face.

4. A magnetic head as defined in claim 1 wherein said fluid introducing means opens through the operative face of said head.

5. A magnetic head as defined in claim 1 wherein said fluid introducing means is a tube extending through the operative face at the approximate center of the operative face.

6. A magnetic head as defined in claim 2 wherein said controlling means includes a normally open valve which opens said fluid introducing means to atmospheric pressure when inactive and a normally closed valve that prevents the fluid under pressure from entering into said fluid introducing means.

7. In a magnetic head for sensing magnetic transitions from a flexible magnetic medium, said head including a plurality of transducers on an operative face of said head for sensing the magnetic transitions as the medium passes adjacent to the transducers, and said operative face having a plurality of slots formed thereon, at least some of said slots being parallel to the motion of the medium and adjacent to either a leading or a trailing edge of said operative face, wherein the improvements comprise:
   means for introducing fluid under pressure between the medium and the operative face of the head;
   means for controlling the fluid under pressure entering into said fluid introducing means;
   said controlling means, when deactuated, opening the fluid introducing means to atmospheric pressure and, when actuated, closing said fluid introducing means to atmospheric pressure and entering the fluid under pressure into said fluid introducing means to form the medium into a tent-like structure over the operative face such that the introduced fluid is contained within the tent-like structure while permitted to controllably escape through the slots and wherein said fluid will escape through the slots when said controlling means is inactivated to stop the entry of fluid under pressure into said fluid introducing means; and
   means for actuating said controlling means when said medium is stationary or near stationary with respect to said head.

8. A stationary magnetic head including;
   a plurality of transducers situated on an operative face of said head in transducing relationship with a flexible magnetic medium;
   said operative face having a plurality of slots formed thereon, said slots extending parallel to the direction of relative motion between said medium and said head and being situated adjacent to the leading and trailing edges of medium contact with the operative face;
   means for introducing fluid under pressure between the medium and said operative face;
   means connected to said fluid introducing means for controlling the provision of fluid under pressure to said fluid introducing means;
   said fluid introducing means introducing fluid under pressure between said medium and said operative face so that a portion of said medium over said operative face is displaced from said face and forms a tent-like structure with said fluid being retained within said structure and permitting the introduced fluid to controllably escape through the slots;
   said controlling means being actuated to provide fluid to said fluid introducing means when said medium is stationary or near stationary relative to said head; and
   wherein said fluid will quickly evacuate through said slots when said means for controlling the provision of fluid is deactivated to stop the entry of fluid under pressure into said fluid introducing means.

9. A magnetic head as defined in claim 7 or 8 wherein said fluid under pressure effects a wedge lift of said medium at a first point of entry of said fluid into said slots, said slots thereby permitting a controlled flow of fluid through said slots and thereby enabling said medium around the periphery of said head to be in a substantially hinged contact with said head.

10. A magnetic head as defined in claim 7 or 8 wherein said controlling means includes a normally open valve which opens said fluid introducing means to atmospheric pressure when inactive and a normally closed valve that prevents the fluid under pressure from entering into said fluid introducing means except when said medium is stationary or near stationary relative to said head.

11. In a magnetic recording device having a magnetic head which is generally stationary during operation, said head having a transducing surface, and a flexible recording medium moving across said transducing surface during magnetic transducing operations;
   a fluid entry device having fluid communication to said transducing surface for introducing fluid between the transducing surface and the recording medium to create a fluid bubble therebetween; and
   valve means connected to said fluid entry device for selectively releasing fluid under pressure through the fluid entry device to selectively create said fluid bubble in a center region of the transducing surface thereby preventing contact between the flexible recording medium and the transducing surface when the recording medium movement speed is less than a certain predetermined value whereby said recording medium is prevented from clinging to said magnetic head.

12. The recording device of claim 11 wherein said transducing surface has a plurality of slots extending in a direction paralleling the direction of said movement between the recording medium and the transducing surface whereby the escape of fluid from the center region of the transducing surface is greatest in the direction of movement of the recording medium.

13. The recording device of claim 12 wherein said fluid entry device is a tube.

14. The recording device of claim 12 wherein said fluid entry device is a tube opening into said center region.

15. The recording device of claim 11 wherein said fluid entry device opens to atmospheric pressure when said recording medium movement exceeds said predetermined value.

16. The recording device of claim 12 wherein said slots include a first plurality of parallel slots extending from a first edge of said head and a second plurality of parallel slots extending from a second edge of said head, said first and second edges being transverse to the movement of said medium.

17. The recording device of claim 12, 13, 14 or 16 wherein said fluid pressure is sufficient to raise said medium off said surface at said center portion of said surface and said slots controllably release a sufficient amount of the introduced fluid so as to maintain said medium situated around a periphery of said surface in substantial contact with said surface to form said fluid bubble.

18. The recording device of claim 1, 2, 3, 6, 7, 8, 11, 12, 15 or 16 wherein said medium is tape.

19. A generally stationary transducing head adapted to exchange signals with a flexible record medium disposed in a transducing relationship with said head when said head and said medium are in relative motion, comprising:
an operative face on said head facing outwardly toward said record medium, said operative face extending to a leading and trailing edge of said head; said operative face having a plurality of slots extending from said leading and trailing edges towards a central portion of said face, said slots extending in the direction of said relative motion between said head and said medium;
means at said operative face for introducing fluid under pressure between said operative face and said medium for moving said medium away from said operative face a distance determined by the fluid introduced between said face and said medium and as permitted to controllably escape through said slots, said fluid under pressure and said slots combining to maintain a central portion of said medium out of contact with said operative face and a peripheral portion of said medium surrounding said central portion in contact with a peripheral portion of said operative face to thereby form said medium into a tent-like shape over the operative face of said head; and
means connected to said introducing means for supplying said fluid under pressure to said introducing means when said relative motion is below a predetermined speed.

20. A generally stationary transducing head adapted to exchange signals with a flexible record medium disposed in a transducing relation with the head, the head having at least one transducer with at least one gap arranged to scan at least one track on the flexible record medium as the head and flexible record medium relatively move at a predetermined speed in the transducing relation;
the improvement including, in combination:
the head having an operative face with the transducer facing outwardly toward the record medium, the operative face having a leading and trailing edge and a plurality of slots extending along the direction of said relative motion in juxtaposition to said leading and trailing edges, respectively;
means having fluid outlet ports at said operative face for controllably introducing fluid under pressure at said operative face adjacent said transducer and between said flexible record medium and said operative face for moving said flexible record medium from said transducing relation a distance determined by said introduced fluid controllably escaping through said slots from between said operative face and said flexible record medium such that said flexible record medium forms an outwardly extending tent-like shape immediately over said transducer; and
means connected to said introducing means for supplying said fluid under pressure to said introducing means when said relative motion between said operative face and said flexible recording medium is below said predetermined speed.

21. A magnetic head as defined in claim 1, 2, 3, 6, 7, 8, 12, 16, 19 or 20 wherein said slots are evenly separated across the width of said medium at each edge parallel to said medium motion to thereby enable said fluid under pressure to support said medium in an even and low profile over said head.

22. A magnetic head as defined in claim 1, 2, 3, 6, 7, 8, 11, 12, 15, 16, 19 or 20 wherein said fluid under pressure is maintained at a pressure between 2 and 5 pounds per square inch.

23. A magnetic head as defined in claim 1, 2, 3, 6, 7, 8, 12, 16, 19 or 20 wherein said slots are situated on said head so as to establish a symmetrical lifting pattern of said medium over said head when provided with said fluid under pressure.

24. In a magnetic tape recorder having tape transport means for transporting tape along a transport path, a magnetic head disposed along the transport path and having a transducing surface facing said transport path so that a magnetic tape being transported along said path in a tape motion direction is in a transducing relation to said magnetic head transducing surface, a plurality of magnetic transducers in said head each having a transducing portion facing said transport path at said transducing surface and being in a predetermined spaced-apart array centrally of said transducing surface;
stop means in said tape transport means to stop the tape in said tape transport path so that a magnetic tape rests on said magnetic head transducing surface and start means in said tape transport means to start the magnetic tape to again move along said tape transport path in said transducing relation;
said magnetic head having first and second edges extending transversely to said tape transport path tape motion direction and being spaced apart along said tape transport path;

said magnetic head having first and second sets of elongated slots opening to said tape transport path and extending, respectively, from said first and second edges toward said spaced-apart centrally-located magnetic transducers;

a bubble generator in fluid communication with said transducing surface for supplying fluid under pressure intermediate said transducing surface and said magnetic tape and in juxtaposition to said magnetic transducers; and a bubble controller coupled to said bubble generator and to said tape transport means for responding to said tape transport means stop means stopping said magnetic tape to actuate said bubble generator to supply fluid under pressure adjacent said magnetic transducers such that a fluid bubble of predetermined extent is created intermediate said magnetic transducers and said magnetic tape, said bubble extending for less than the entire extent of said magnetic tape facing said magnetic head with a predetermined portion of said supplied fluid escaping from being intermediate said transducing surface and said magnetic tape for limiting the generated bubble to be less than said extent of the magnetic tape facing the magnetic head and having further means responsive to said tape transport means start means to stop supplying said fluid such that the start of the magnetic tape movement and removal of the bubble are synchronized whereby the magnetic tape being started returns toward its transducing relation with the magnetic head while the magnetic tape is starting to move.

25. A method for controlling an interface condition between a flexible medium and a generally stationary magnetic transducing head when a portion of said medium is in a stationary or near stationary condition adjacent an operative face of said head, comprising the steps of:

supplying fluid under pressure to an interface area between said medium and said operative face, when said medium is in said stationary or near stationary condition; and permitting the controlled escape of said fluid under pressure from said interface area so that said medium is held away from said head in a central portion of said head but remains in contact or near contact with a peripheral portion of said head.

26. A method for controlling an interface region between a generally stationary transducing head and a flexible record medium disposed in a transducing relation with said head comprising the steps of:

introducing fluid under pressure into said interface region between said head and said medium when said medium is stationary or nearly stationary with respect to said head;

controlling the flow of fluid under pressure so that said interface region is open to a source of fluid under pressure when said medium is stationary or near stationary and is open to atmospheric pressure when said medium is in motion relative to said head; and controlling the escape of fluid under pressure from said interface region by means of slots formed in distal portions of an operative face of said head for enabling portions of said medium around the periphery of said operative face to be in contact or near contact with said face and portions of said medium near a central portion of said face to be kept out of contact with said face.

* * * * *